United States Patent

[11] 3,545,578

| [72] | Inventor | Juan Belart<br>Walldorf, Hessen, Germany |
|---|---|---|
| [21] | Appl. No. | 745,441 |
| [22] | Filed | July 17, 1968 |
| [45] | Patented | Dec. 8, 1970 |
| [73] | Assignee | Alfred Teves GmbH,<br>Frankfurt am Main, Germany<br>a corporation of Germany |
| [32] | Priority | July 25, 1967 |
| [33] | | Germany |
| [31] | | No. T34406 |

[54] WEAR-COMPENSATING BRAKE ADJUSTMENT MECHANISM
9 Claims, 4 Drawing Figs.

[52] U.S. Cl. .................................................. 188/196,
188/71.8, 188/79.5

[51] Int. Cl. .................................................. F16d 65/56,
F16d 55/18
[50] Field of Search .......................................... 188/72,
73(C), 79.5(GE), 196(FR), (RR), (PRR), 71.8

[56] References Cited
UNITED STATES PATENTS
| 3,334,713 | 8/1967 | Russell | 188/196 |
| 3,361,232 | 1/1968 | Engle | 188/196 |

*Primary Examiner*—Duane A. Reger
*Attorney*—Karl F. Ross

ABSTRACT: A wear-compensating brake adjustment mechanism with an internally threaded sleeve engaged by a threaded member and connected to a clutch and cam arrangement that rotates the member relatively to the sleeve as the brakes are released to adjust the brakeshoe travel.

JUAN BELART
*INVENTOR.*

BY  *Karl G. Ross*

ATTORNEY

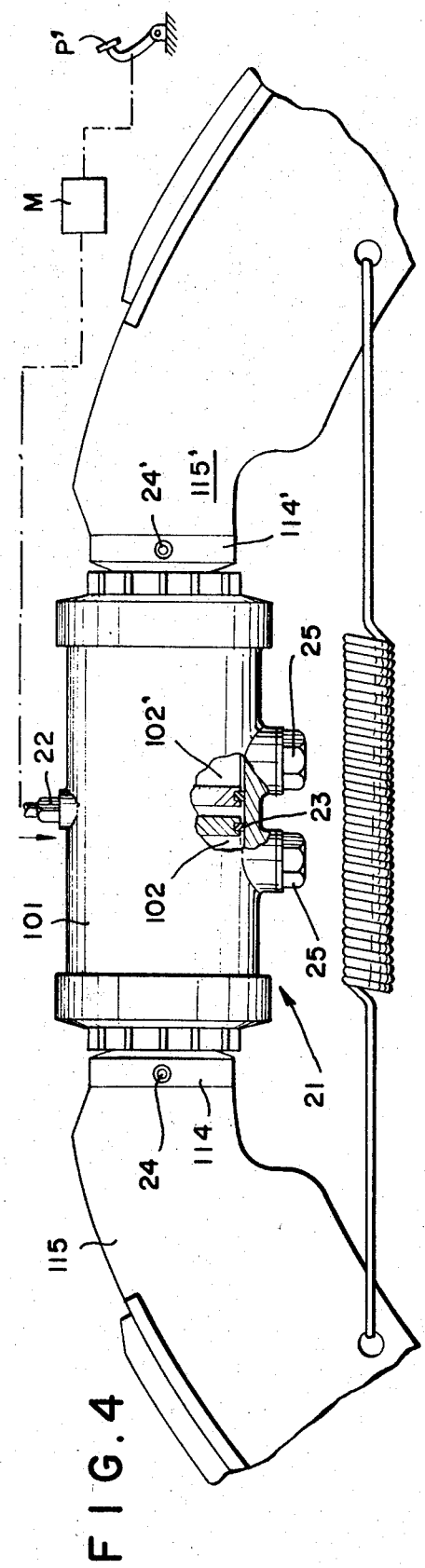
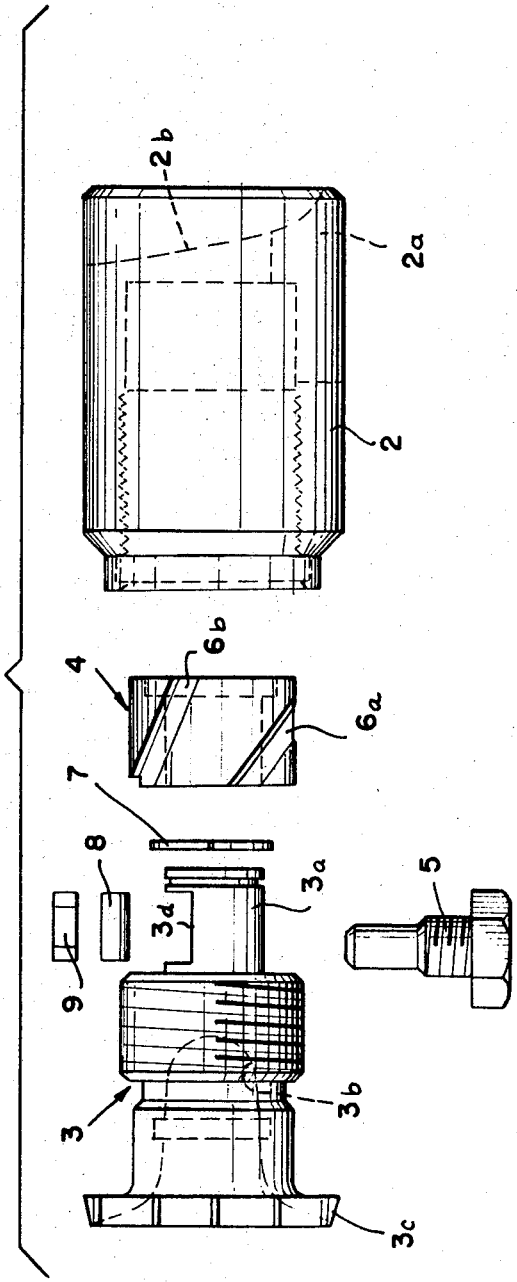
JUAN BELART
*INVENTOR.*
BY *Karl J. Ross*
ATTORNEY

WEAR-COMPENSATING BRAKE ADJUSTMENT MECHANISM

My invention relates to a wear-compensating brake adjustment mechanism and, more particularly, to such a mechanism wherein an internally threaded sleeve is engaged by a threaded member such that, in case of a predetermined large brake travel resulting from brakeshoe wear, the two threaded parts are rotated relatively to increase the effective length of the unit and establish a new rest position of the brakeshoe.

Adjustment mechanisms for such purposes are well known in the art. It has been proved that a threaded arrangement is the best in that this spreads the wear over the greatest possible area. On the other hand, these known adjustment mechanisms are subject to a good deal of wear for the threads are moved against each other under great pressure since adjustment usually takes place on actuation of the brakes. This obviously caused the device to wear at a great rate.

It is an object of my invention to provide a brake mechanism that wears less than those known heretofore, while being of relatively simple construction, compact configuration and low cost.

This is achieved, in accordance with my invention, by providing means enabling the adjustment to take place when the brakes are released, as the brakeshoes disengage the wheel drum or disc. During the brake release action the whole brake, adjustment mechanism included, is under much less strain than when the brakes are applied so that the wear is proportionally less. My invention makes this possible by providing an arrangement that screws the two threaded parts against one another to transform the axial braking movement into a rotational adjustment movement during the disengagement of the brakeshoes from the wheel drum or disc.

According to a more specific feature of this invention, a pair of threadedly interconnected members is provided between an actuator for the brake and the brakeshoe, at least one of these members being rotatable while the members are axially displaceable jointly by the actuator. Cam means is provided to cooperate with the rotatable threaded member and engages the latter with play so that rotation of the threaded member is effected only after a predetermined axial stroke of the threaded members corresponding to the desired brake play. Further axial displacement of the threaded members, which may form the piston assembly of a hydraulically actuated brake or may be disposed between a mechanical brake actuator and the brakeshoe, corresponds to the displacement necessary to compensate for wear of the brake linings and results in an angular displacement of the rotatable threaded member by the cam means. Furthermore, unidirectionally effective clutch means is provided between the angularly displaceable threaded member and the cam means to permit angular displacement of the clutch member during braking movement of the assembly without angular advance of the rotatable threaded member, such advance occurring only upon the return movement of the assembly following the brake actuating stroke and corresponding to relief of the braking pressure on the brakeshoe. When the rotatable member is a male portion, the cam means may include a ring carried upon a small diameter step of this male member and received within the female member. The latter is axially slotted to pass a camming pin which reaches through the female member into engagement with the clutch ring. The ring is formed along its exterior with a high-pitch helical groove engaged by the pin rotating the male member.

More particularly my invention provides a helically grooved ring fitting around the threaded member which is here an adjustment bolt such that this ring is rotatable thereon but not axially movable thereon. In other words, the cam ring is axially entrained with the male threaded member. The adjustment bolt threadedly engages the sleeve which is axially movable to force a brakeshoe against a brake drum or disc for braking action.

The camming pin is fixed to the housing of this mechanism and passes through an axially extending slot in the sleeve thereby permitting only axial movement thereof, and engages in one of the helical grooves of the ring causing it to rotate on extended axial movement. A chordal portion of the adjustment bolt is removed in the area of this bolt surrounded by the ring. The arcuate recess thereby brought into being receives the clutch means in the form of a roller held by a small spring so that the roller remains on one side of the chordal, arcuate recess. In this way when the brake is actuated the ring can rotate freely on the bolt as it is moved axially with the bolt and its helical groove is engaged cammingly by the fixed pin; however, when the brake is released the roller, unhindered by the spring, wedges between the ring and the bolt thereby turning the bolt inside the nonrotatable sleeve. The groove is slightly wider than the pin so that a normal amount of brake play can take place without actuation of the adjustment mechanism.

My adjustment mechanism is applicable to a mechanical or hydraulic disc or drum brake. Regardless of the type of brake involved, my new adjustment mechanism has the feature of wearing less than the prior-art mechanisms while not presenting any additionally complicated construction features.

The above-mentioned object and others of my invention which will become more apparent are described in the following with reference to the drawing in which:

FIG. 3 is an expanded view of my invention; and

FIG. 4 is a side view of a portion of a drum brake equipped with my invention.

Figure 1:
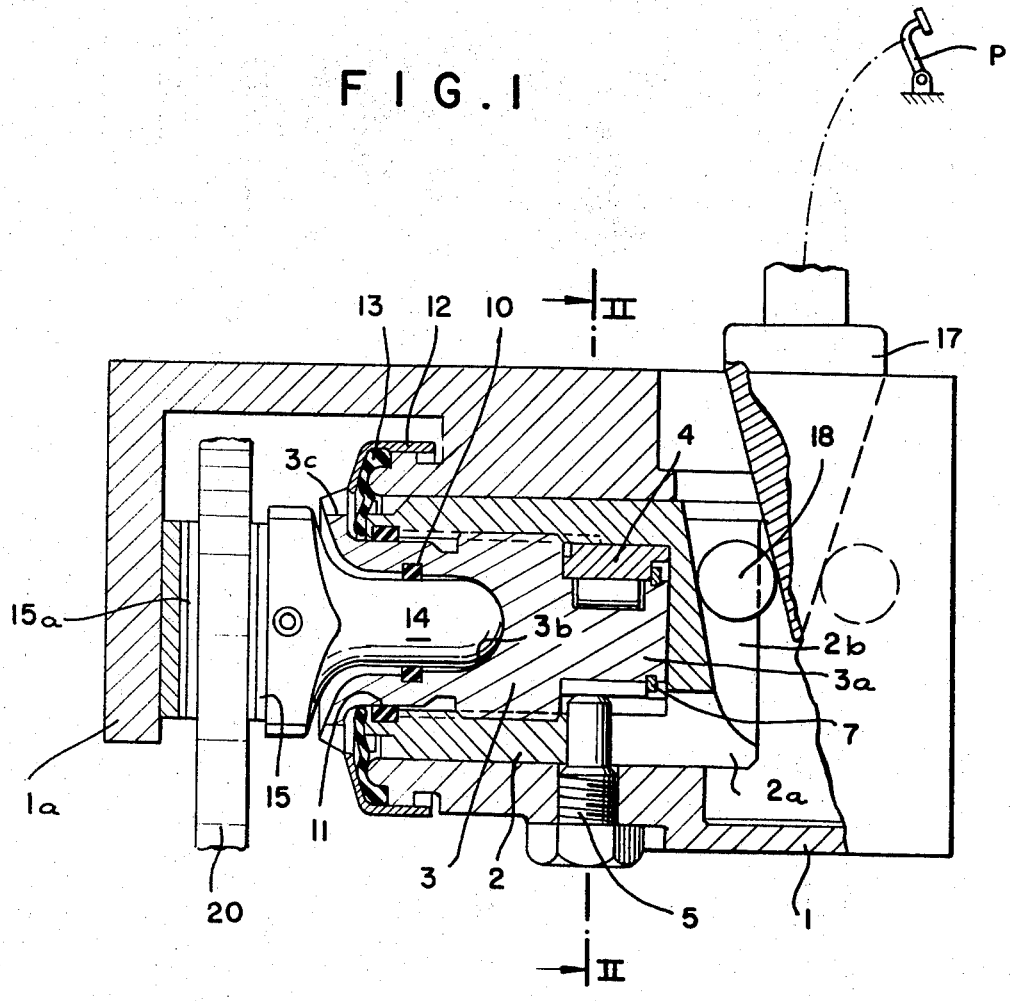
FIG. 1 is an axial section through a mechanical floating-yoke disc brake equipped with my invention.
Figure 2:
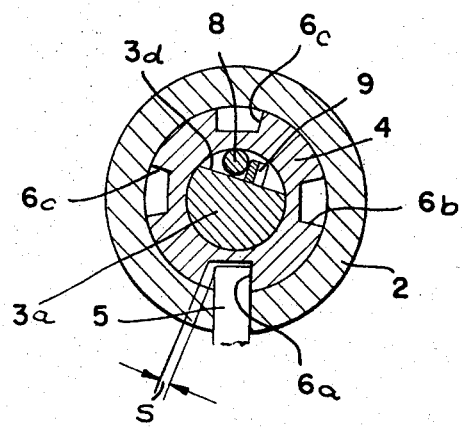
FIG. 2 is a cross section through the FIG. 1 brake along line II–II of FIG. 1.

The floating-yoke disc brake of FIGS. 1 and 2 has a housing 1 and a caliper 1a attached thereto receiving the adjustment mechanism according to my invention. An internally threaded nonrotatable sleeve 2, slidably mounted in the housing 1, threadedly and coaxially receives a concentric adjustment bolt 3. The bolt 3 has a small diameter stepped portion 3a upon which a ring 4 is rotatable; the ring 4 is axially entrained with the bolt by a snap ring 7. The ring 4 is formed with helical grooves 6a—d. A locking screw 5 mounted fixedly in the housing 1 passes through an axially extending slot 2a in the sleeve 2 and engages in the groove 6a, permitting longitudinal, axial movement only of the sleeve 2 and axial movement accompanied by rotational movement derived from the grooves 6a-–d of the camming ring 4.

The end of the bolt 3 opposite the stepped-in end 3a has a hollow spheroidal mouth 3b which swivelably receives the corresponding spherical end of a stem 14 carrying a brakeshoe 15; the caliper 1a carries an opposing shoe 15a on the opposite side of a brake disc 20. A gasket 13 held in place by a metallic cap 12, a gasket 11, and a gasket 10 protect the interior of the mechanism from entrance of foreign bodies and contaminants. The bolt 3 is provided with a grooved or milled end flange 3c for easy manual adjustment.

As best seen in FIG. 2, the portion 3a has a chordal cutout portion 3d in which a small roller 8 and a small leaf spring 9 are held.

A wedge 17 (FIG. 1) cooperating with an angled groove 2b and a roller 18 serves to actuate the disc brake of FIG. 1. Downward movement of the wedge 17 caused by actuation of a pedal P connected thereto through mechanical means illustrated schematically by a dot-dash line, forces the roller 18 to the left and downward in FIG. 1. This pushes the sleeve 3 to the left and brings the brakeshoes 15 and 15a to bear on the disc 20 as in the commonly assigned application Ser. No. 642,915, filed 1 June 1967 now U.S. Pat. No. 3,425,519.

FIG. 4 shows the wheel-cylinder portion of a hydraulic drum brake as shown at p. 429 of Principles of Automotive Vehicles (Superintendent of Documents, Washington, D.C., Jan. 1956). Here a wheel cylinder 21 has a housing 101 in which two sleeves 102 and 102' are slidable, connected to each of these sleeves 102 and 102' are brakeshoes 115 and 115' by means of stems 114 and 114' and pins 24 and 24' respectively. Internally the two mechanisms are the same as the embodiment of FIGS. 1—3 except that the facing ends of the sleeves 102 and 102' are closed and flat, as seen in the broken away portion of FIG. 4 for action thereon by pressurized hydraulic fluid entering through a nipple 22 from a master cylinder M actuated by a pedal P'. In addition gaskets 23 (one only visible in FIG. 4) seal the sleeves 102 and 102' against the housing 101.

The adjustment mechanism operates as follows:

Under normal conditions, with normal brake travel, axial movement of the sleeve 2 entrains the bolt 3 (the FIG. 1 embodiment being used for illustrative purposes) but only moves the ring 4 relative to pin 5 enough to partially close up a gap S (FIG. 2) existing between the screw 5 and the flank of the groove 6a and corresponding to normal brake play. Thus the ring 4 is not caused to rotate and no adjustment takes place.

Should the brakeshoes 15 and 15a wear, the axial movement of the sleeve 2, until the brakeshoes engage the disc, will be increased. This causes the screw 5 to contact the side of the groove 6a and to rotate the ring 4 since the groove 6a is helical, the screw 5 is fixed, and the movement of the ring 5 is axial. This results in rotation of the ring 4 only, since the roller 8 rests against the spring 9 such that this roller 8 does not wedge between the bolt 3 and the ring 4. However, when the brake is released and the threaded assembly urged backwardly by the usual springs (not shown), the ring 4 is pushed back to its original position and the screw 5 comes into contact with the side of the groove 6a again causing the ring 4 to turn back in the opposite direction. This rotation causes the clutch roller 8 to wedge between the portion 3a and the ring 4 so that this bolt 3 is also rotated. In this way the bolt 3 is advanced a small amount in relation to the sleeve 2 and the brake is adjusted to compensate for brakeshoe wear.

When the brakeshoes 15, 15a, 115, 115a have to be replaced, the locking screw 5, 25 need merely be screwed out to disengage the ring 4 and the adjustment bolt 3 can be manually screwed back in to allow for the added thickness of new brakeshoes.

The improvement described and illustrated is believed to admit of many modifications within the ability of persons skilled in the art, all such modifications being considered within the spirit and scope of the invention except as limited by the appended claims.

I claim:

1. A wear-compensating brake adjustment mechanism for a brake having actuating means and a brakeshoe, said adjustment mechanism comprising:
    a housing;
    a pair of axially movable threadedly interconnected members received in said housing and interposed between said actuating means and said brakeshoe for displacing same upon movement of said members in a brake-actuating direction, one of said members being rotatable in said housing relatively to the other of said members;
    cam means rotatable in said housing relative to said one member and axially entrained therewith for rotation upon axial movement of said one member beyond a predetermined distance; and
    clutch means for locking said cam means and said one member in one sense of rotation thereof and for permitting relative rotation between said cam means and said one member upon rotation of said camming means in the opposite sense, said cam means including a ring freely rotatable relatively to said one of said members and said clutch means including a wedging element interposed between said ring and said one of said members for jamming same together for joint rotation in said one sense.

2. The mechanism defined in claim 1 wherein said cam mean is so constructed and arranged that said one sense of rotation thereof corresponds to the rotation taking place upon travel of said one member beyond said predetermined distance opposite said direction, said opposite sense corresponding to rotation of said cam member upon travel of said one member beyond said predetermined distance in said direction, said one member being a bolt and the other member being formed as a sleeve receiving said bolt.

3. The mechanism defined in claim 2 wherein said ring is formed with a helical groove and is rotatable on said bolt, said cam means further comprising a projection fixed on said housing and engaged in said groove, said bolt being formed with a reduced-diameter step and a shoulder defining said step, said ring being mounted on said step, said step being formed with a recess defined by a chordal plane substantially parallel to the axis of said member, said wedging element being formed as a roller adapted to be wedged between said bolt and said ring in said one sense of rotation of said ring.

4. The mechanism defined in claim 3 wherein said groove is wider than said projection in axial direction and forms therewith a lost-motion coupling actuated upon said travel of said bolt beyond said predetermined distance.

5. The mechanism defined in claim 3 further comprising an abutment on said step, said ring being axially entrained in one direction by said abutment and in the opposite direction by said shoulder.

6. The mechanism defined in claim 3 wherein said projection is a pin threaded into a wall of said housing from the exterior.

7. The mechanism defined in claim 6 wherein said sleeve is formed with an axially extending slot and said bolt passes through said slot into engagement with said groove and prevents rotation of said sleeve in said housing.

8. The mechanism defined in claim 3, further comprising a spring in said recess urging said roller into wedging contact between said bolt and said ring in said one sense of rotation thereof.

9. A wear-compensating brake adjustment mechanism for a brake having actuating means and a brakeshoe, comprising:
    a rotatable bolt and an axially displaceable sleeve threadedly engaging said bolt while surrounding same, said sleeve and said bolt forming an effectively elongatable force-transmission means interposed between said actuating means and said brakeshoe for displacing same upon axial movement of said bolt and said sleeve in a brake-actuating direction, said bolt being provided with a small diameter portion having a generally chordal flat thereon;
    a camming ring journaled on said small diameter portion and freely rotatable thereon, said camming ring being formed with a generally helical groove, said sleeve having an axially extending opening registering with at least part of said groove;
    a projection fixed relatively to said actuating means and said brakeshoe and reaching generally radially through said opening into said helical groove for rotating said ring upon axial displacement of said sleeve and said bolt; and
    a wedging roller on said flat and spring means bearing upon said roller for jamming same between said ring and said bolt for coupling said ring and said bolt for joint rotation in one sense while permitting free rotation of said ring on said bolt in the opposite sense.